(12) United States Patent
Hardin et al.

(10) Patent No.: US 7,188,859 B2
(45) Date of Patent: Mar. 13, 2007

(54) SHOPPING BAG CARRIER

(76) Inventors: Kelly L. Hardin, 5359 N. Rd. 400 W., Bargersville, IN (US) 46106; Gregory T. Hardin, 5359 N. Rd. 400 W., Bargersville, IN (US) 46106; Robert C. Brockmann, 3106 Walton Way, Kokomo, IN (US) 46902

(*) Notice: Subject to any disclaimer, the term of this patent is extended or adjusted under 35 U.S.C. 154(b) by 32 days.

(21) Appl. No.: 11/192,588

(22) Filed: Jul. 29, 2005

(65) Prior Publication Data

US 2006/0027999 A1    Feb. 9, 2006

Related U.S. Application Data

(60) Provisional application No. 60/599,183, filed on Aug. 5, 2004.

(51) Int. Cl.
*B62B 3/00*  (2006.01)
*B62B 1/00*  (2006.01)

(52) U.S. Cl. .............. 280/652; 280/47.24; 280/47.2

(58) Field of Classification Search .......... 280/652, 280/655, 47.24, 38, 40, 47.2, 47.315, 651, 280/47.371, DIG. 3, DIG. 6
See application file for complete search history.

(56) References Cited

U.S. PATENT DOCUMENTS

| | | | | |
|---|---|---|---|---|
| 1,216,941 A | * | 2/1917 | Camp | 248/99 |
| 2,421,322 A | * | 5/1947 | Frazin | 280/655 |
| 2,556,814 A | * | 6/1951 | Love | 280/659 |
| 2,602,676 A | * | 7/1952 | Fieldhouse | 280/47.12 |
| 3,043,603 A | * | 7/1962 | Major, Sr. | 280/40 |
| 3,934,895 A | * | 1/1976 | Fox | 280/47.26 |
| 4,576,389 A | * | 3/1986 | Villaveces et al. | 280/43.16 |
| 4,830,385 A | | 5/1989 | Wallick | |
| 4,989,889 A | | 2/1991 | Perez | |
| 5,678,842 A | | 10/1997 | Hook | |
| 5,722,594 A | | 3/1998 | Farr | |
| 5,984,327 A | | 11/1999 | Hseih | |
| 6,425,599 B1 | | 7/2002 | Tsai | |
| 6,439,596 B1 | | 8/2002 | Tsai | |
| 6,447,002 B1 | * | 9/2002 | Fang | 280/646 |
| 6,923,466 B2 | * | 8/2005 | Tsai | 280/646 |
| 2002/0089134 A1 | | 7/2002 | Salzberger | |
| 2002/0096862 A1 | * | 7/2002 | Fang | 280/652 |
| 2002/0185844 A1 | | 12/2002 | Gregory | |

* cited by examiner

*Primary Examiner*—Christopher P. Ellis
*Assistant Examiner*—John R. Olszewski
(74) *Attorney, Agent, or Firm*—Frank D Lachenmaier

(57) ABSTRACT

In accordance with the present invention, a shopping bag carrier is described which is light in weight, easily portable by collapsing to a very small foot print and is simple to manufacture and use without complex mechanisms and linkages.

1 Claim, 4 Drawing Sheets

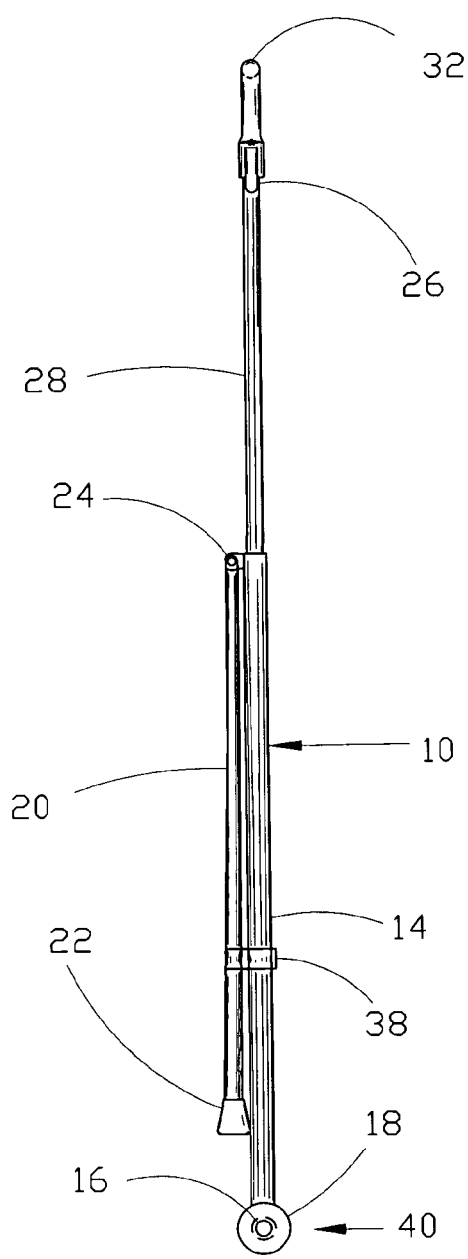
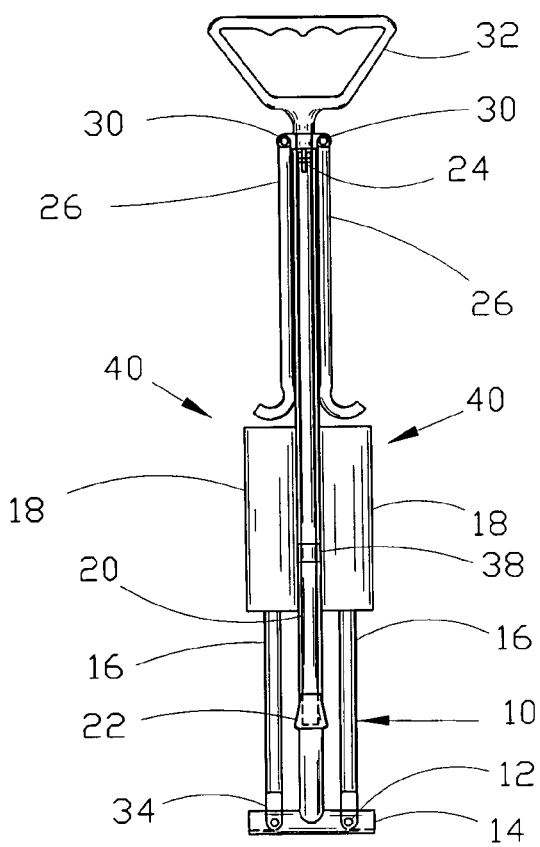
FIG. 3
FIG. 4

SHOPPING BAG CARRIER

CROSS-REFERENCE TO RELATED APPLICATION

This application claims the benefit of Provisional Patent Application Ser. No. 60/599,183 filed Aug. 5, 2004

BACKGROUND

1. Field of Invention

This invention relates generally to carts designed to carry shopping bags while shopping continues after the first purchase. More specifically, this invention relates to a unique collapsible shopping bag carrier that that can be collapsed into a very small shape for easy portability when not in use.

2. Prior Art

Perez and Farr Utility Patents are both directed at bag carriers where the bag is a built-in part of the carrier.

Hsieh, Tsai, Tsai and Gregory basically are two wheel carts with a shelf pivotally attached to a vertical support member with a collapsible handle and fold-in wheels for easy transportation or storage.

The Salzberger design is targeted at a simple three piece snap together, disposable cart for grocery or shopping bags supplied by the merchant with each purchase as shopping bags are today. Wallick discloses a two wheel cart with a front rest bar so that when bags are hanging from the top bar pegs, the cart does not need to be attended to remain upright as would Salzberger. A rear handle can be pushed down behind the axis of the wheels lifting the front rest off the ground and allowing the cart to be either pushed or pulled. Although the Wallick vertical support bar and the rear handle are adjustable the system is not collapsible for optimum consumer convenience.

Hook has a very similar collapsing mechanism to the standard golf cart with a pivoting frontward protruding bar with hooks for suspending bags, two pivoting large wheels and a pivoting handle all of which collapse axially and can be strapped together for storage. Hook is a heavy, complex large wheeled system.

SUMMARY

An object of the present invention is to provide a reusable shopping bag carrier that is collapsible into a compact shape, which is light in weight and easy to open. A further object is for the carrier to have an extendable vertical handle, fold out bag carrier arms and fold out axles with small diameter wheels to minimize collapsed dimensions yet allow for ease in pulling from store to store. The handle is extended in use and for storage is telescoped down along its shaft with the two fold out arms with hooks for securing shopping bag handles pivotally attached just below the handle. In the preferred embodiment the shopping bag carrier has a kick stand type of leg that is unclipped and extended away from the frame allowing the shopping bag carrier to remain upright while unattended, but is closed and clipped to the frame when moving from store to store.

DRAWINGS

In order that the invention may be more fully understood it will now be described by way of example, with reference to the accompanying drawings in which:

FIG. 3 is a side view a shopping bag carrier with the stabilizer leg clipped to main frame.

FIG. 4 is a rear view of a shopping bag carrier with bag holder arms and axle wheel assemblies folded to their storage positions and the handle telescoped to its shortest position.

REFERENCE NUMERALS

The same reference numbers are used to refer to the same or similar parts in the various views.

10—shopping bag carrier
12—axle pivot pin
14—T-frame
16—axle
18—wheel
20—stabilizer leg
22—stabilizer leg foot
24—stabilizer leg pivot
26—bag holder arms
28—handle shaft
30—bag holder arm pivot
32—handle
34—axle pivot flats
36—storage sleeve
38—stabilizer leg clip
40—wheel assembly
42—wrist strap

DESCRIPTION

Figure 1:
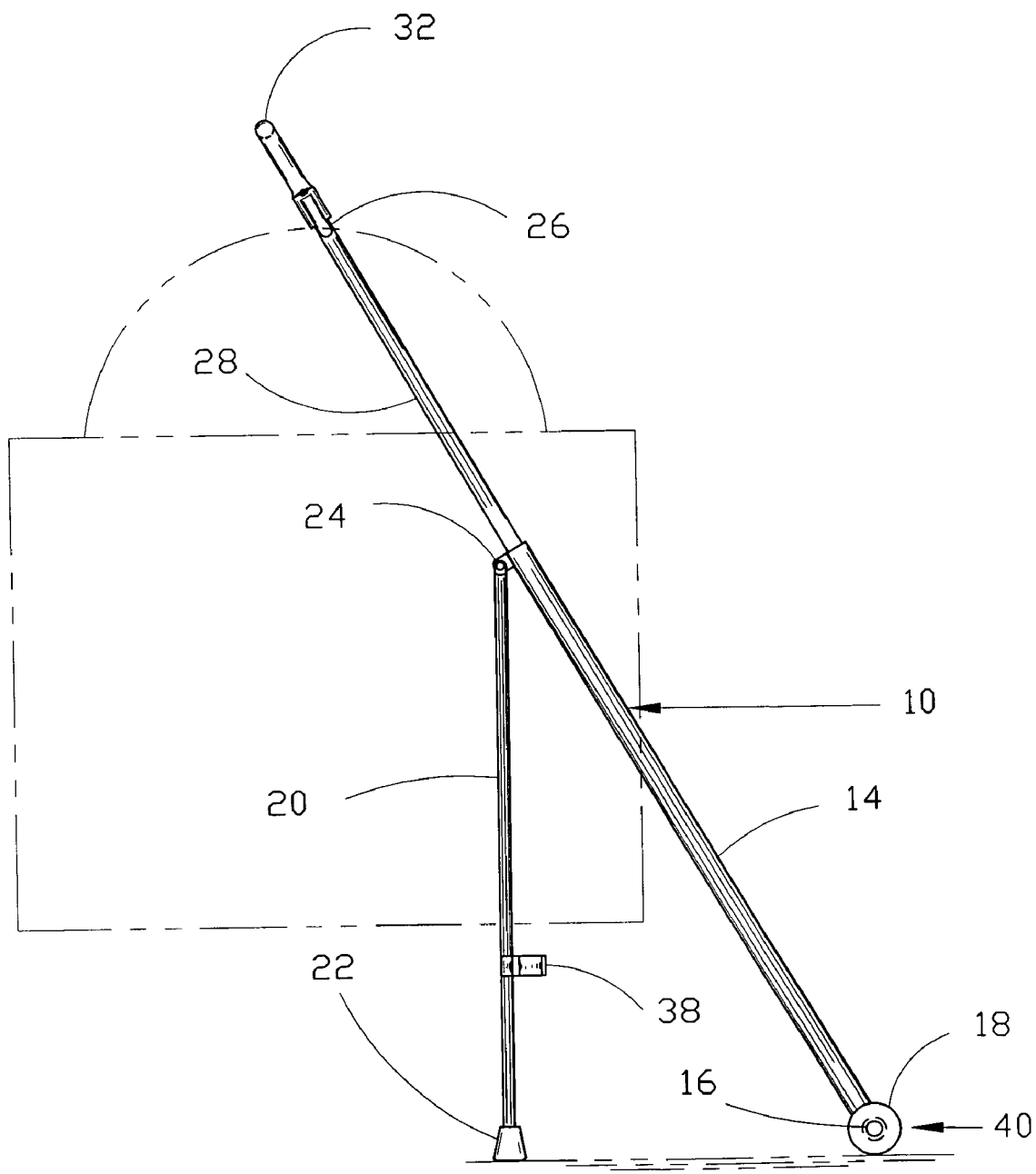
FIG. 1 is a side view of a shopping bag carrier with stabilizer leg extended.

In order that the invention may be more fully understood, shopping bag carrier 10 will now be described by way of example with reference to the accompanying drawings in which FIG. 1 illustrates in a side view, telescoping handle shaft 28 extended to its full height by pulling on handle 32 until it clicks into its open detent position. It also shows bag holder arms 26 pivoted into their latched bag carrying position. This view shows T-frame 14 with axle 16 and wheel assemblies 40 pivotally mounted and lowered and latched into their use positions. It also shows a stabilizer leg 20 pivotally mounted to the top of T-frame 14 at stabilizer leg pivot 24 and extended to a vertical attitude when shopping bag carrier 10 is inclined to approximately a 30 degree angle from vertical for temporary unattended shopping bag retention. FIG. 1 also illustrates stabilizer leg clip 38 which holds stabilizer leg 20 against T-frame 14 when it is in its moving position but is easily disengaged for temporary stops. This view also shows stabilizer leg foot 22 mounted over the end of stabilizer leg 20 providing a no-skid pad to assure that shopping bag carrier does not slip, slide or mark the floor when extended and left unattended. The shopping bag shown in phantom lines is for illustration only and is not part of this invention.

Figure 2:
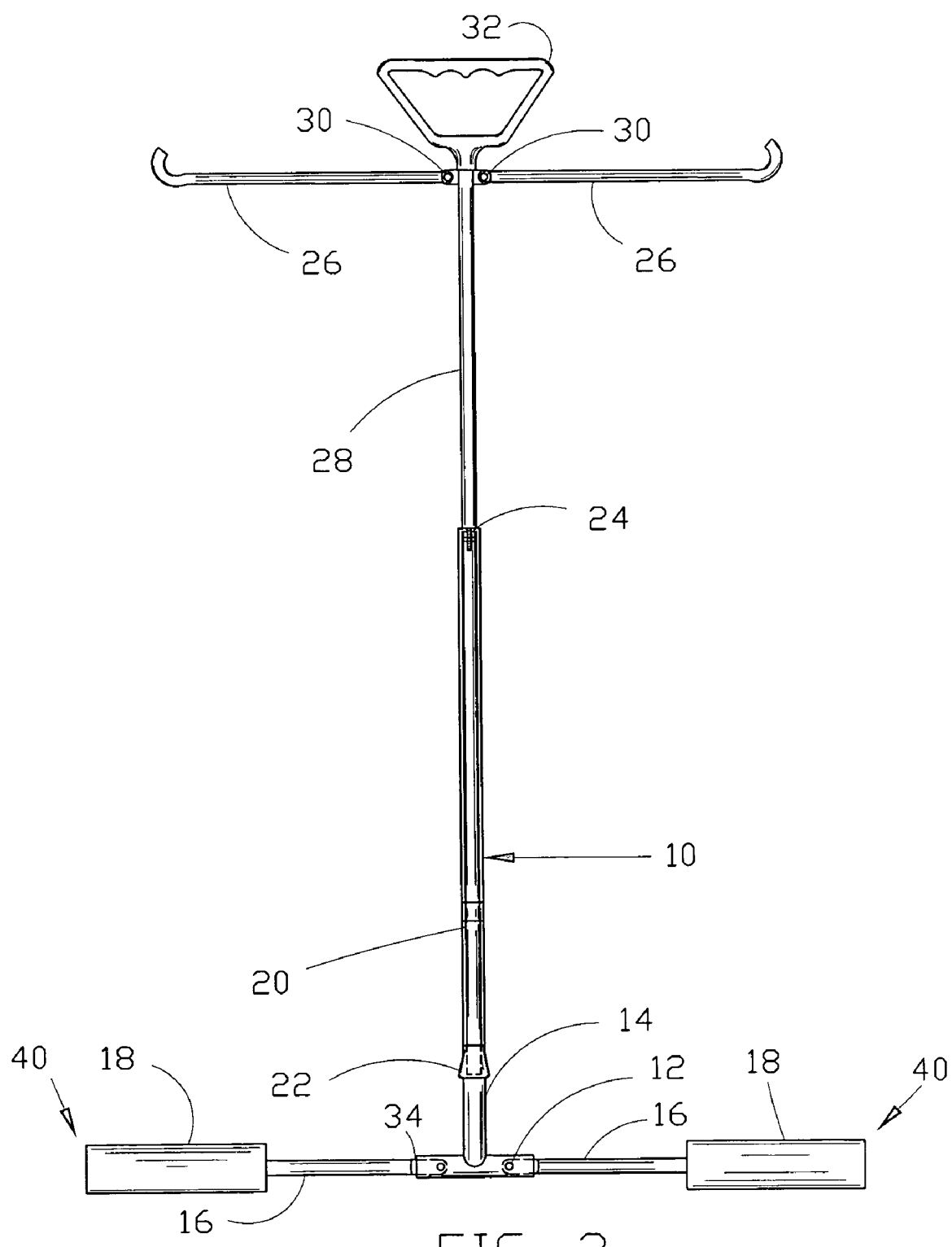
FIG. 2 is a rear view of a shopping bag carrier with bag holder arms and wheel axle assemblies unfolded and handle extended.

FIG. 2 shows a rear view of shopping bag carrier 10 with handle 32 mounted onto handle shaft 28 which has been telescoped out of T-frame 14 to its full height. Two bag holder arms 26 are mounted to handle shaft 28 at bag holder arm pivots 30. This view also shows two axles 16 attached to T-frame 14 with axle pivot pins 12. Mounted on axles 16 are wheel assemblies 40 which are made of small diameter (approximately 13/16 inch) wheels 18 to minimize the overall collapsed dimension yet wide enough (approximately 3 inches in width) to roll smoothly with a numerous shopping bag load.

FIG. 3 discloses a side view of shopping bag carrier 10 with wheel assemblies 40, bag holders 26, handle shaft 28 and stabilizer leg 20 all in the move positions of FIG. 2.

FIG. 4 shows a rear view of shopping bag carrier 10 with wheel assemblies 40 folded up along side of T-frame 14, bag holder arms 26 folded down along side T-frame 14, stabilizer leg 20 clipped to T-frame 14 with clip 38 and handle shaft 28 telescoped down into inner diameter of T-frame 14.

Figures 5, 6:
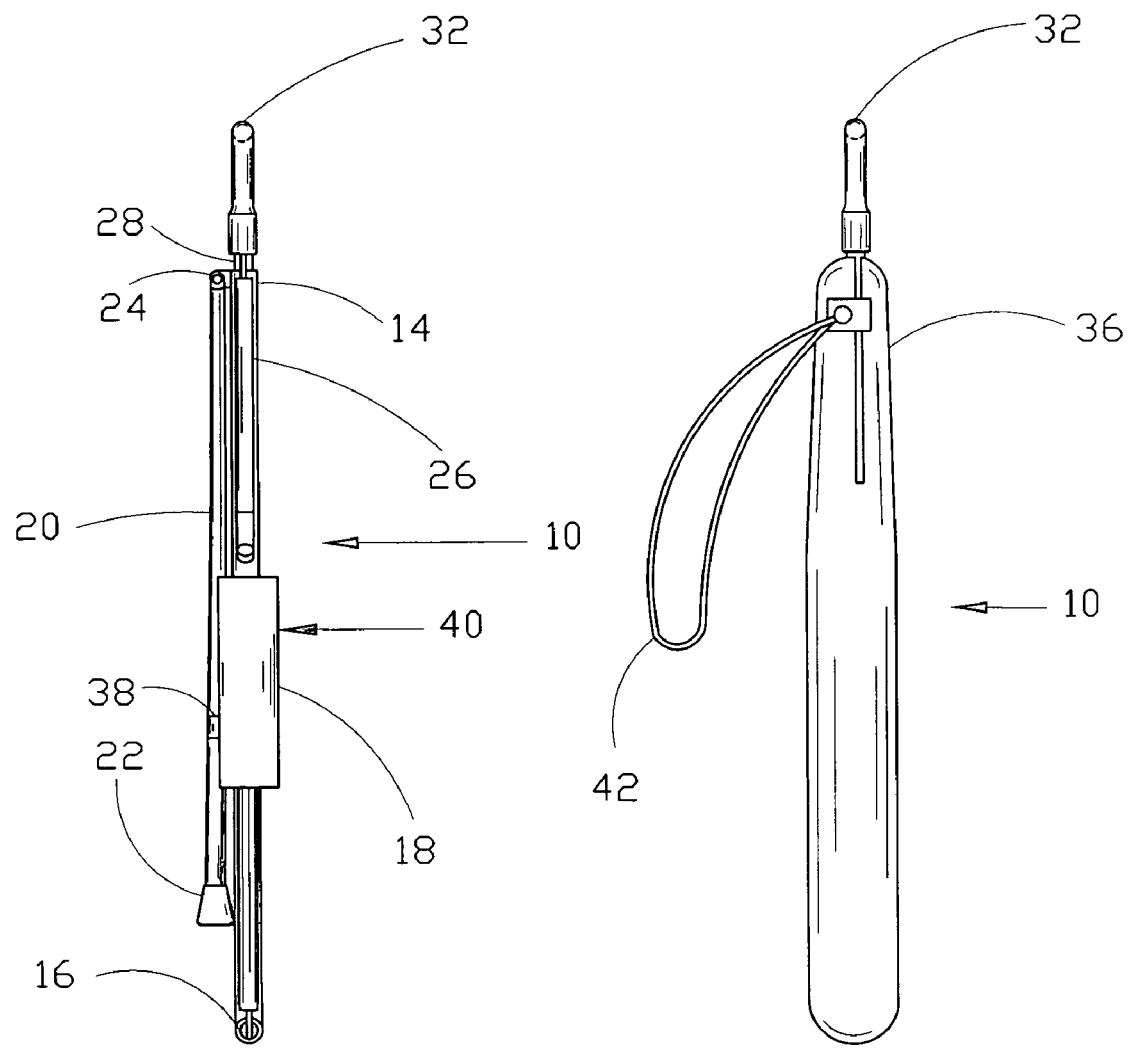
FIG. 5 is a side view of a shopping bag carrier collapsed for storage or transportation to site of use.
FIG. 6 is a side view of a shopping bag carrier collapsed for storage and inserted into its storage sleeve.

FIG. 5 discloses a side view of shopping bag carrier 10 with wheel assemblies 40, bag holders 26, handle shaft 28 and stabilizer leg 20 all in the collapsed storage or portage positions of FIG. 4.

FIG. 6 is a side view of a collapsed shopping bag carrier 10 enclosed in its storage sleeve 36 with wrist strap 42.

In the preferred embodiment, handle 32 is molded from a polymeric material and fastened onto handle shaft 28 which can be made from 1/4 inch diameter tubing from a strong light weight material such as aluminum approximately 16 inches in length with two bag holder arm pivots 26 welded on either side at the top end just below where the bottom of handle 32 attaches.

T-frame 14 is a weldment of two sections of 3/8 inch diameter tubing, one an approximately 22 inch long section inserted perpendicularly into 3/8 inch diameter hole in the center of the other, an approximately 2 inch long section at the bottom end and welded together. Pivot point section 24 is welded to the top of the 22 inch long section of 3/4 inch diameter tubing, 90 degrees from the attitude of the 2 inch long section. The 2 inch long section of 3/8 inch diameter tubing has approximately 5/8 inch long, by approximately 1/4 inch wide slots cut into the top thickness of the 3/8 inch diameter tubing starting from each end, and 1/16 inch diameter through holes for axle pivot pins approximately 1/2 inch in from each end.

Stabilizer leg 20 is preferably made from 3/16 inch diameter tubing with a flat and pivot hole at the top end and polymeric material boot 22, like for a chair leg, slipped over the bottom end of its approximate 19 inch length. The pivot at the top limits its extension away from T-frame 14 to approximately 30 degrees.

Axles 16 are preferably formed from 1/4 inch diameter rod approximately 12 inches in length with 5/8 inch by 1/2 inch flats on both sides of the proximal end and a 1/16 inch diameter through hole for the axle pivot pin approximately 1/2 inch from the proximal end. The small diameter wheels 18 are approximately 13/16 inch in outside diameter by approximately 3 inches in length, molded from a plastic or rubber material onto roller bearings which press fit onto the distal ends of axle 16 making wheel assemblies 40.

Bag holder arms 26 are preferably formed from a 3/16 inch diameter by approximately 10 inch long rod with hooks or notches to retain bag handles at their distal ends and have a flat at the proximal end and a through hole for a pivot pin.

Storage sleeve 36 can be made from plastic or a wear resistant cloth with a snap detail as in umbrella sleeves and may include a wrist strap 42 for carrying convenience.

OPERATION

To utilize this invention, Shopping bag Carrier 10 is carried to a store or mall in its collapsed state in storage sleeve 36. Its collapsed state dimensions are approximately 26 inches in length and 2 inches in diameter and as such could be carried with a wrist strap or in a large hand bag or other shopping bag. At the store, shopping bag carrier 10 is removed from storage sleeve 36; handle 32 pulled out until handle shaft 28 reaches its extant detent position; wheel assemblies 40 are folded down into their snap lock positions; and bag holder arms 26 lifted into their snap latch positions. Multiple bags may be hung from bag holder arms 26 as shopping continues. Each time the shopper wants to stop and look at other potential purchases, stabilizer leg 20 can be detached from the stabilizer leg clip 38 and used to prop shopping bag carrier 10 in a stable condition to be left momentarily unattended. When the shopper is ready to move to the next store or department, stabilizer leg 20 is simply clicked back into stabilizer leg clip 38. When returning to the car, the shopper removes her shopping bags from bag holder arms 26, pushes the handle shaft 28 down into T-frame 14, pushes bag holder arms 26 down parallel to the T-frame 14, lifts wheel assemblies 40 up parallel to the T-frame 14 and slides collapsed shopping bag carrier 10 back into its protective storage sleeve 36.

As will be apparent to one skilled in this art and in light of the previous disclosure, optional accessories could coupled to hooks on T-frame 14 as desired. For example a book bag or brief case attachment (not shown) would be within the scope of this invention. Many alterations in materials and scaling are possible in the practice of this invention without departing from the scope thereof. Accordingly, the scope of this invention is to be construed in accordance with the following claims and not limited by the exemplary embodiment described above.

What is claimed is:

1. A collapsible shopping bag carrier comprising:
   (a) an elongated tubular frame having a T-frame bottom section slidably coupled to a top handle shaft section, said frame being adjustable between a deployed position wherein said top handle shaft section extends and latches above the T-frame section for pulling said bag carrier, and a collapsed position wherein the two sections telescopically engage each other;
   (b) a handle attached to the distal end of said top handle shaft for pulling, pushing or steering said shopping bag carrier in said deployed position;
   (c) two pivotally mounted axles extending at right angles on opposite sides of bottom section of said T-frame with wide, small diameter wheel assemblies mounted on said axles and latched in deployed position and folded up along side said T-frame in collapsed position;
   (d) two pivotally mounted bag holder arms coupled to the top of said top handle shaft section, just below the bottom of said handle attachment to said handle shaft which extend out from said handle shaft in a parallel plane to said axles in the deployed position and fold down along the T-frame in the collapsed position;
   (e) a stabilizer leg pivotally coupled to distal end of said T-frame section whereby its deflection from said T-frame section is limited to approximately 30 degrees creating a three point platform with said two wheel assemblies when deployed for unattended stability or folded down along said T-frame section and clipped to said T-frame section when in transit mode; and (f) a storage sleeve to slip over collapsed shopping bag carrier whereby said collapsed carrier can be transported conveniently by a wrist strap attached to said sleeve or carried in a large hand bag, shopping bag or luggage without concern for soiling adjacent articles with dirty wheels.

* * * * *